(12) United States Patent
Ahmad et al.

(10) Patent No.: US 12,200,818 B2
(45) Date of Patent: Jan. 14, 2025

(54) TEMPORARY LOCAL NUMBER ASSIGNMENT

(71) Applicant: T-Mobile USA, Inc., Bellevue, WA (US)

(72) Inventors: Asma Perveen Ahmad, Snoqualmie, WA (US); Raymond T. Ball, Seattle, WA (US); Nassereddine Sabeur, Bellevue, WA (US); Shujaur R. Mufti, Snoqualmie, WA (US); Saqib Badar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 399 days.

(21) Appl. No.: 17/692,046

(22) Filed: Mar. 10, 2022

(65) Prior Publication Data
US 2023/0292107 A1    Sep. 14, 2023

(51) Int. Cl.
*H04W 8/06* (2009.01)
*H04W 8/26* (2009.01)
(52) U.S. Cl.
CPC .............. *H04W 8/26* (2013.01); *H04W 8/06* (2013.01)
(58) Field of Classification Search
CPC .................................. H04W 8/06; H04W 8/26
See application file for complete search history.

(56) References Cited

U.S. PATENT DOCUMENTS

| 2006/0205404 | A1* | 9/2006 | Gonen | H04W 8/06 455/433 |
| 2007/0167167 | A1* | 7/2007 | Jiang | H04M 7/1235 455/432.1 |
| 2010/0085937 | A1 | 4/2010 | Pressley et al. | |
| 2011/0026463 | A1 | 2/2011 | Lair | |
| 2013/0201933 | A1 | 8/2013 | Dennert | |
| 2013/0217396 | A1* | 8/2013 | Geffner | H04W 8/26 455/445 |
| 2016/0295393 | A1 | 10/2016 | Speks | |

OTHER PUBLICATIONS

International Searching Authority, International Search Report and Written Opinion, PCT Patent Application PCT/US2023/064090, mailed Jun. 21, 2023, 10 pages.

* cited by examiner

*Primary Examiner* — Michael T Vu
(74) *Attorney, Agent, or Firm* — Perkins Coie LLP

(57) ABSTRACT

Systems, methods, and devices that relate to enabling roaming users to use various communication services by assigning temporary local numbers are disclosed. In one example aspect, a method for wireless communication includes entering a visited network by a roaming device. The roaming device has a primary number associated with its home network. The method includes requesting a local number associated with the visited network by the roaming device and performing a communication using the local number associated with the visited network.

7 Claims, 16 Drawing Sheets

TEMPORARY LOCAL NUMBER ASSIGNMENT

BACKGROUND

With the rising volume of global traveling, international roaming has been increasingly prevalent. At the same time, mobile communication technologies are moving the world toward an increasingly connected and networked society. Seamless call routing and data redirection across multiple communication carriers to enable roaming usage of various mobile applications can be beneficial for international travelers around the world.

Figure 1:
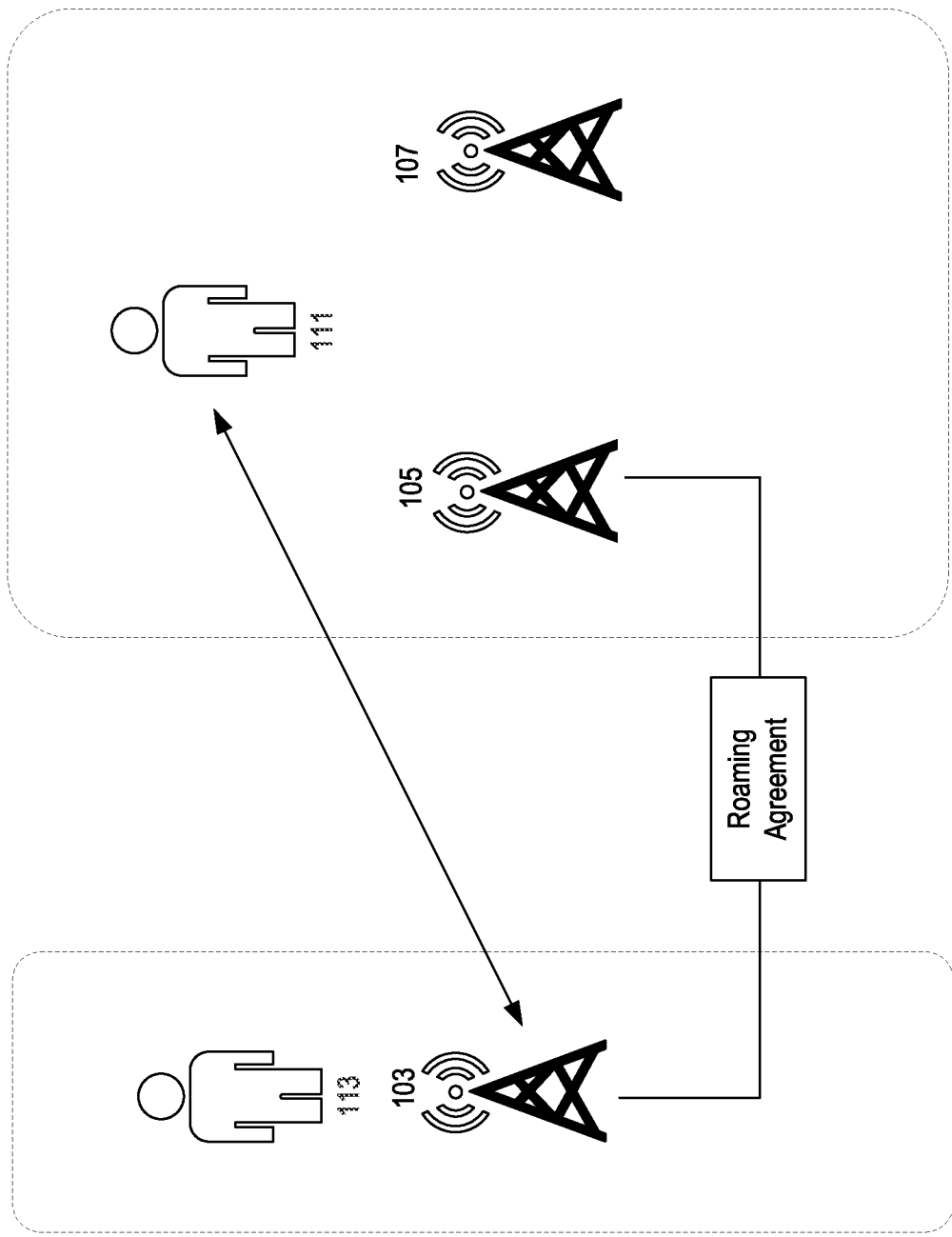
FIG. 1 illustrates an example of an international roaming scenario.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Section headings are used in the present document only to improve readability and do not limit scope of the disclosed embodiments and techniques in each section to only that section. Certain features are described using examples of Long-Term Evolution (LTE) and/or Fifth Generation (5G) wireless protocol. However, applicability of the disclosed techniques is not limited to only LTE/5G wireless systems.

With the uptick of international traveling, allowing mobile users to continue to use their wireless devices across different countries and carriers is becoming increasingly important. The ubiquitous use of mobile data services brings additional complexity in roaming scenarios. For instance, certain mobile applications, such as local delivery services or WiFi access services, depend on the use of local numbers in the visited networks. Currently, to be able to use these services, roaming users need to purchase local subscriber identification module (SIM) cards so as to obtain local numbers, leading to additional costs and burdens for the users. Furthermore, there are still mobile devices that do not support dual-SIM mode, causing a tremendous amount of inconvenience for users who would like to take advantage of their own roaming plans yet to enjoy local communication or data services. This patent documents discloses techniques, such as a local number assignment and management system, that can be implemented in the core network to allow network operators to reserve and manage a pool of local numbers for roaming users to enable the roaming users to communicate using local numbers without the need to purchase separate SIM cards or service plans. The disclosed technology can greatly improve roaming user experience and potentially bring in more revenue for carriers with roaming agreements in place.

International mobile roaming is a service that allows mobile users to continue to use their mobile phones or other mobile devices to make and receive voice calls, send and receive text messages, browse the internet, and use other mobile applications while visiting another country. Roaming extends the home operator's coverage, allowing the mobile users to continue using their home phone numbers and data services in another country. FIG. 1 illustrates an example of an international roaming scenario. When a mobile user 111 is outside of his/her home network (e.g., in a foreign country) and turns the mobile device on, the mobile device attempts to communicate with one or more visited mobile networks 105, 107. At least one of the visited networks 105, 107 picks up the connection from the user's mobile device 111, recognizes whether it is registered with its system, and attempts to identify the user's home network 103. If there is a roaming agreement between the home network 103 and one of the mobile networks in the visited country (e.g., network 105), a call from the mobile user 111 is routed by the visited network 105 towards an international transit network to deliver the call to the destination network. The visited network also requests service information from the home network 103 about the user, such as whether the mobile device is authorized for international use. If the phone is authorized for use, the visited network 105 creates a temporary subscriber record for the device and the home network 103 updates its subscriber record on where the device is located so if a call is made to the phone it can be appropriately routed.

With the increasing popularity of feature phones and smartphones, the use of mobile data services while roaming also grows exponentially. Often times, however, subscribers that roam internationally do not have the capability to use certain applications and services due to non-availability of a local mobile phone number, because these applications and services (e.g., delivery services, services to access local networks) rely on local mobile numbers for communication and/or user verification. For example, a European roaming user may not be allowed to use local services or applications (e.g., Uber) in the United States because the local services or applications rely local U.S. numbers, causing great inconvenience to the roaming user.

This patent document discloses techniques that can be implemented in various networks to allow roaming users to acquire local numbers from network operators to facilitate the usage of such applications and services. In particular, network operators can reserve a pool of local numbers for international roaming users. A roaming user can request an assignment of a local number that maps to its international number. Once the local number is temporarily assigned, the mapping of the local number and roaming number can be stored by the network operator and used by the user for the duration of the travel.

Example scenarios of inbound and outbound roaming are described in the sections below.

Inbound Roaming

For home network operators, to enable the assignment of temporary local numbers for inbound roaming traffic, a pool of local numbers can be reserved and managed by a local number (LN) pool management system (PMS). Each network operator can determine which numbers can be allocated into this pool (e.g., numbers with specific digits). Alternatively, or in addition, network operators in the same nation can agree on a shared pool of local numbers allocated roaming purposes. For example, a network operator can have its own dedicated pool of temporary local numbers and a second pool of numbers shared with other operators in the region. When the network operator exhausts all the numbers in its own pool, it can request additional numbers from the shared pool.

Figure 2:
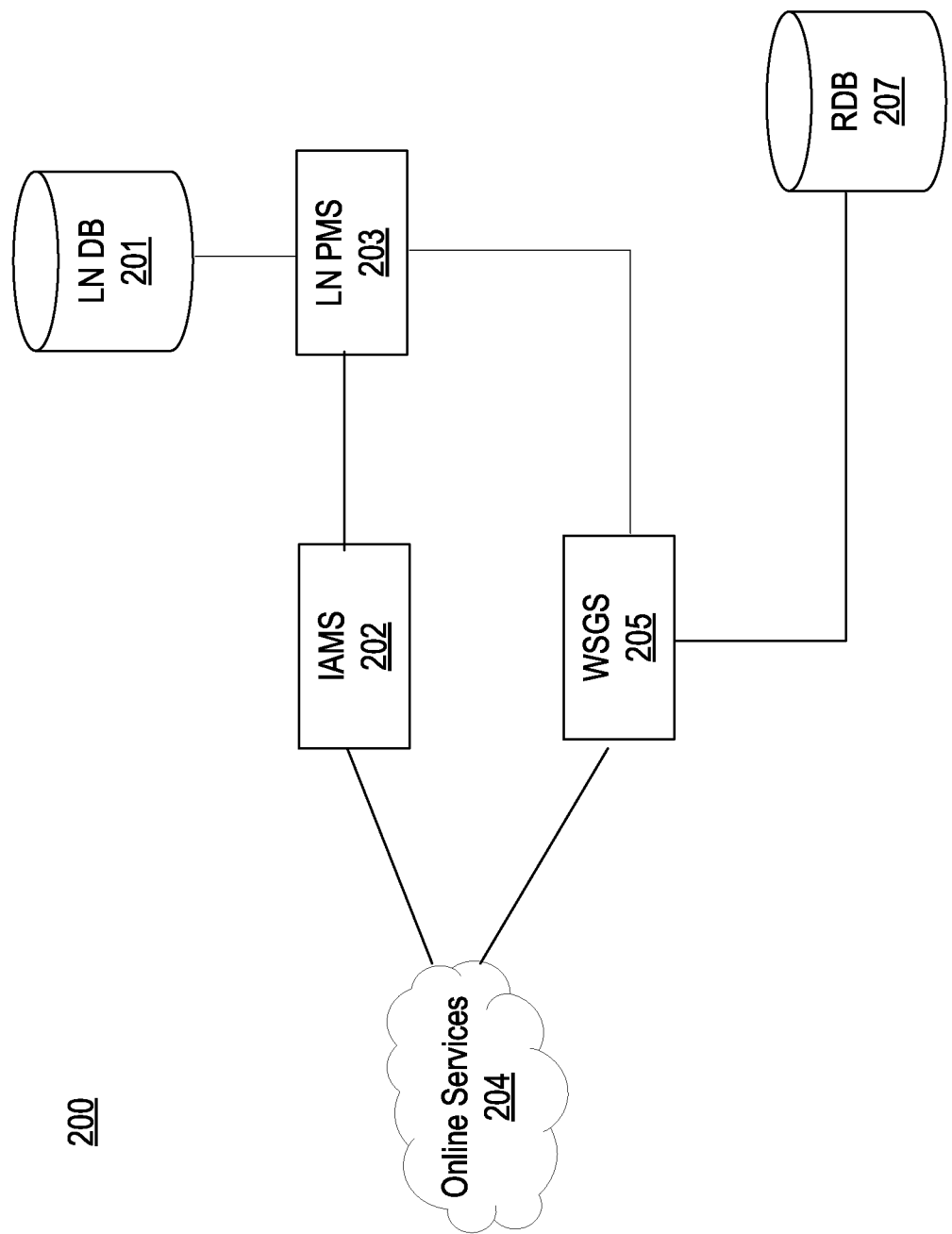
FIG. 2 illustrates an example visited network architecture having a local number pool management system in accordance with one or more embodiments of the present technology.

FIG. 2 illustrates an example visited network architecture 200 having a local number pool management system in accordance with one or more embodiments of the present technology. The network 200 includes a LN Database (DB) 201 that is configured to store the pool of reserved local numbers. The network 200 also includes a LN PMS 203 that is configured to support the mapping between international roaming numbers and the local reserved numbers, and to provide life cycle management of these local numbers.

When a roaming user enters the Visited Public Land Mobile Network (VPLMN) 200 and requests to use the online services 204, an Identity and Access Management Server (IAMS) 202 configured to provide identify management and provide access control to various services checks whether the user is authorized to use roaming services. If the user is authorized to do so, a message can be delivered to the user to ask whether the user wants to acquire a local number.

If the user indicates that a local number is desired, the LN PMS 203 can query the LN DB 201 to assign a local number from the pool of reserved and available local numbers.

When the local number is assigned to a roaming user, the assigned local number is mapped to an identifier of the roaming user. For example, the international number of the roaming user can be mapped to the assigned local number consistent with the existing routing mechanism(s). The following discussions use the international/roaming number (RN) of the roaming user in the mapping. It is noted, however, that alternative or additional user identifiers, such as the International Mobile Equipment Identity (IMEI) and/or the International Mobile Subscriber Identifier (IMSI) can be used in the mapping as well.

The mapping between the roaming international number and the local number can be stored in the Roaming Database (RDB) 207 via a gateway sever, such as the Web Services Gateway Server (WSGS) 205 that is a point of control, access and validation of Web service requests. Other types of gateway servers can also be used to facilitate the communication between the RDB and other network nodes. In the RDB, the local number can be stored as a primary number and international number can be stored as secondary number. Subsequently, when the roaming user requests an online service, a query to the RDB can be made to determine whether the mapping exists.

In some embodiments, the LN PMS 203 can communicate with the WSGS 205 and LN DB 201 using the REST Application Programming Interface (API). A REST API conforms to the constraints of REST architectural style and allows for interaction with RESTful web services. REST stands for representational state transfer. Alternative or additional APIs can also be used to facilitate the communication between LN PMS 203, WSGS 205, and the LN DB 201. The LN PMS 203 is responsible for enforcing various policies regarding the use of the local numbers. For example, the LN PMS 203 can enforce a one-to-one mapping of the roaming number and the local number. That is, each roaming user can only be assigned with one local number. As another example, the LN PMS 203 can manage the life cycle of the mapping by enforcing a recycling/reusing policy of the local numbers, e.g., for privacy protection and security concerns. In some embodiments, once the local number is assigned and a mapping is created, the local number can stay activated and valid for as long as the roaming user is registered with the network. In some embodiments, the local number can remain active for a predetermined period of time. The number needs to be reactivated if the roaming user desires to continue use it in the visited network. The LN PMS 203 can refresh a timestamp that is associated with the local number indicating whether the local number is actively being used by the roaming user. Once the roaming user de-registers with the network (e.g., returning to its home network), the assigned local number is deactivated. The recycling/reusing policy can specify that the deactivated local number cannot be assigned again to another roaming user for a predetermined period of time (e.g., 60 days) to avoid inadvertent disclosure of user related information to other parties so as to ensure the proper protection of the user's privacy data.

Figure 3:
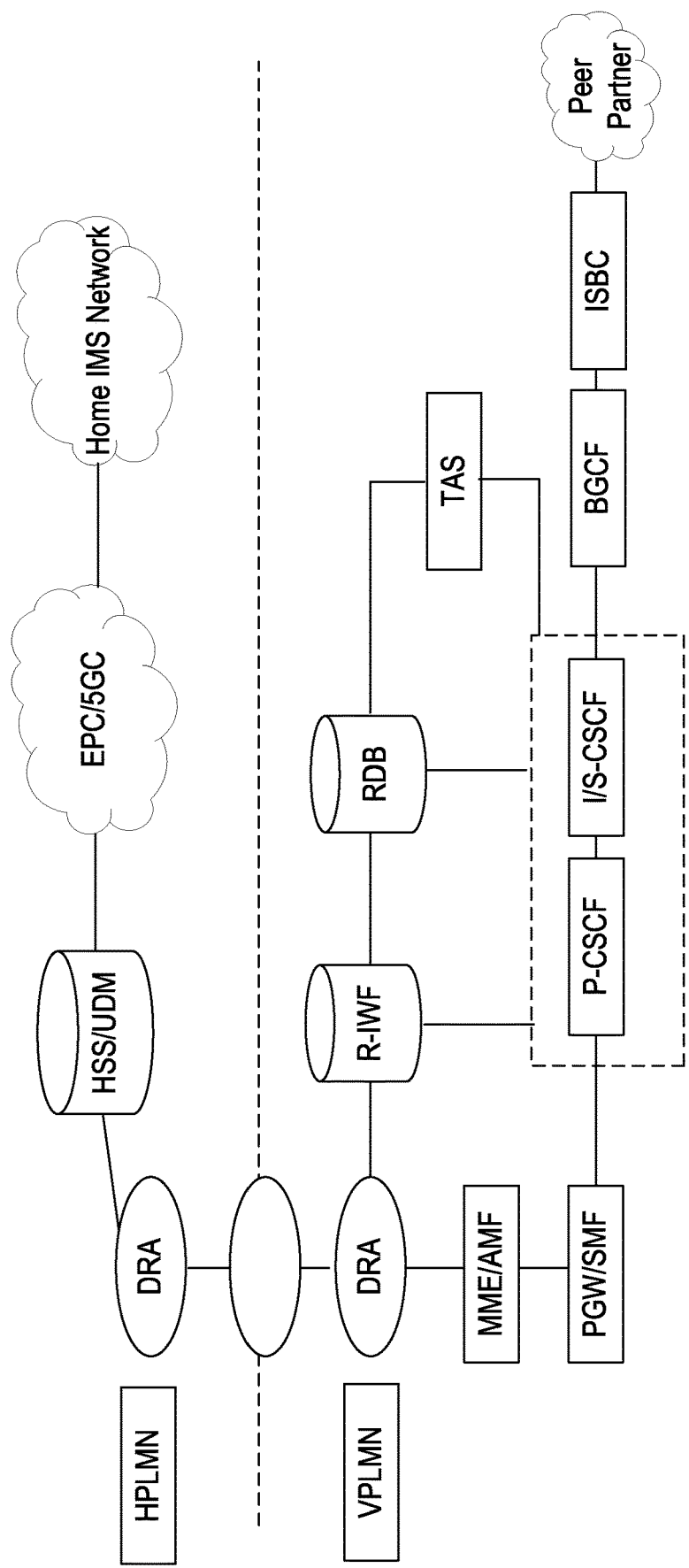
FIG. 3 illustrates an example high-level network architecture for inbound roaming scenarios in accordance with one or more embodiments of the present technology.

FIG. 3 illustrates an example high-level network architecture for inbound roaming scenarios in accordance with one or more embodiments of the present technology. In this example, the Home Public Land Mobile Network (HPLMN) communicates with the VPLMN via one or more Diameter Routing Agents (DRAs). The HPLMN provides user profile and/or information to the VPLMN via the Home Subscriber Server (HSS) or the Unified Data Management (UDM). The VPLMN includes the Mobility Management Entity (MME) for the LTE network or the Access and Mobility Management Function (AMF) for the 5G network. The MME/AMF entity is in communication with the Public Data Network (PDN) Gateway (PGW) or the Session Management Function (SMF), which in turn are in communication with the Proxy Call Session Control Function (P-CSCF), the Interrogating Call Session Control Function (I-CSCF), and/or the Serving Call Session Control Function (S-CSCF) (together referred to as the CSCF). A roaming interworking function (R-IWF) and the RDB are in communication with the CSCF to provide local number and/or mapping information to the CSCF. The RDB is also connected to a Telephony Application Server (TAS) configured to provide telephony applications and additional multimedia functions. Other network functions/nodes, such as the Breakout Gateway Control Function (BGCF) and the Interconnect Session Border Controller (ISBC), are also connected to provide communication to peer partners.

Figure 4A:
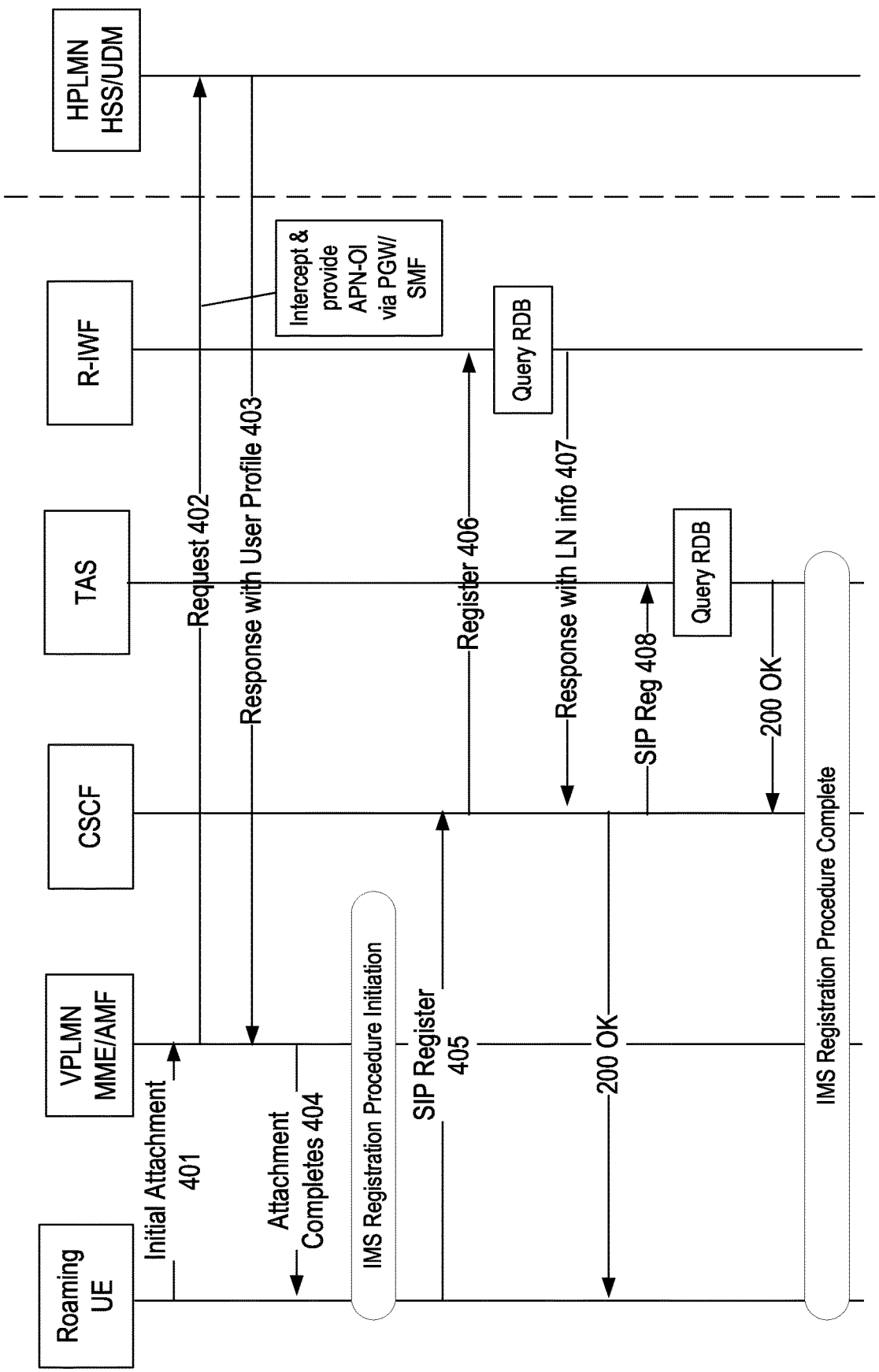
FIG. 4A illustrates an example signaling sequence for Internet Protocol Multimedia Subsystem (IMS) registration for inbound roaming users in accordance with one or more embodiments of the present technology.

FIG. 4A illustrates an example signaling sequence for IMS registration for inbound roaming users in accordance with one or more embodiments of the present technology. A roaming user equipment (UE) enters into the VPLMN and attempts to access the network. The roaming UE transmits an initial attachment or a session establishment request to the MME in the LTE network or the AMF in the 5G network at operation 401. The MME/AMF transmits a request to a network node in the HPLMN, such as the HSS or the UDM, to obtain user information for user authentication/authorization at operation 402.

In the backbone network, an Access Point Name (APN) is a reference to a gateway node in the network. The APN includes an APN Network Identifier and an APN Operator Identifier (APN OI). Normally, the roaming UE is led back to the HPLMN for the IMS registration procedure based on the APN 01 of the home operator. However, if a local number is requested, the response from the HPLMN can be intercepted at operation 403 via the PGW/SMF such that an APN Operator Identifier (APN-OI) Replacement field is used to complete subsequent IMS registration procedure(s) within the VPLMN. Upon completion of user authentication/authorization at operation 404, the VPLMN MME/AMF informs the UE that the attachment has completed. A bearer for IMS APN can then be established within the VPLMN.

To initiate the Internet Protocol (IP) Multimedia Subsystem (IMS) registration procedure, the roaming UE sends a Session Initiation Protocol (SIP) register message to a Call Session Control Function (CSCF) node in the VPLMN at operation 405. The CSCF node forwards the SIP register message to the R-IWF at operation 406. The R-IWF queries the RDB and transmits the local number IP multimedia public identity (IMPU) to CSCF along with the original roaming number (RN) IMPU to the CSCF at operation 407. As a part of the IMS registration procedure, the CSCF also transmits a message to the TAS at operation 408. The TAS interacts with the RDB to download the profile for the local number if it exists. The IMS registration procedure then completes with both CSCF and TAS aware of the mapping.

For outgoing calls or services (e.g., the roaming UE initiates the calls or service requests), a specific prefix can be used to indicate whether the local number can be used for the call. In some embodiments, the local number mapping is enabled for all regular calls/services. In some embodiments, the local number mapping is only enabled for a subset of services/applications (e.g., mobile delivery applications), for example, at an application/service level. If the prefix is not used, the roaming number remains the default number for the call. For example, in some embodiments, the local number mapping is disabled for special calls, such as emergency services and other services to provide accurate international user information for the relevant authorities.

Figure 4B:
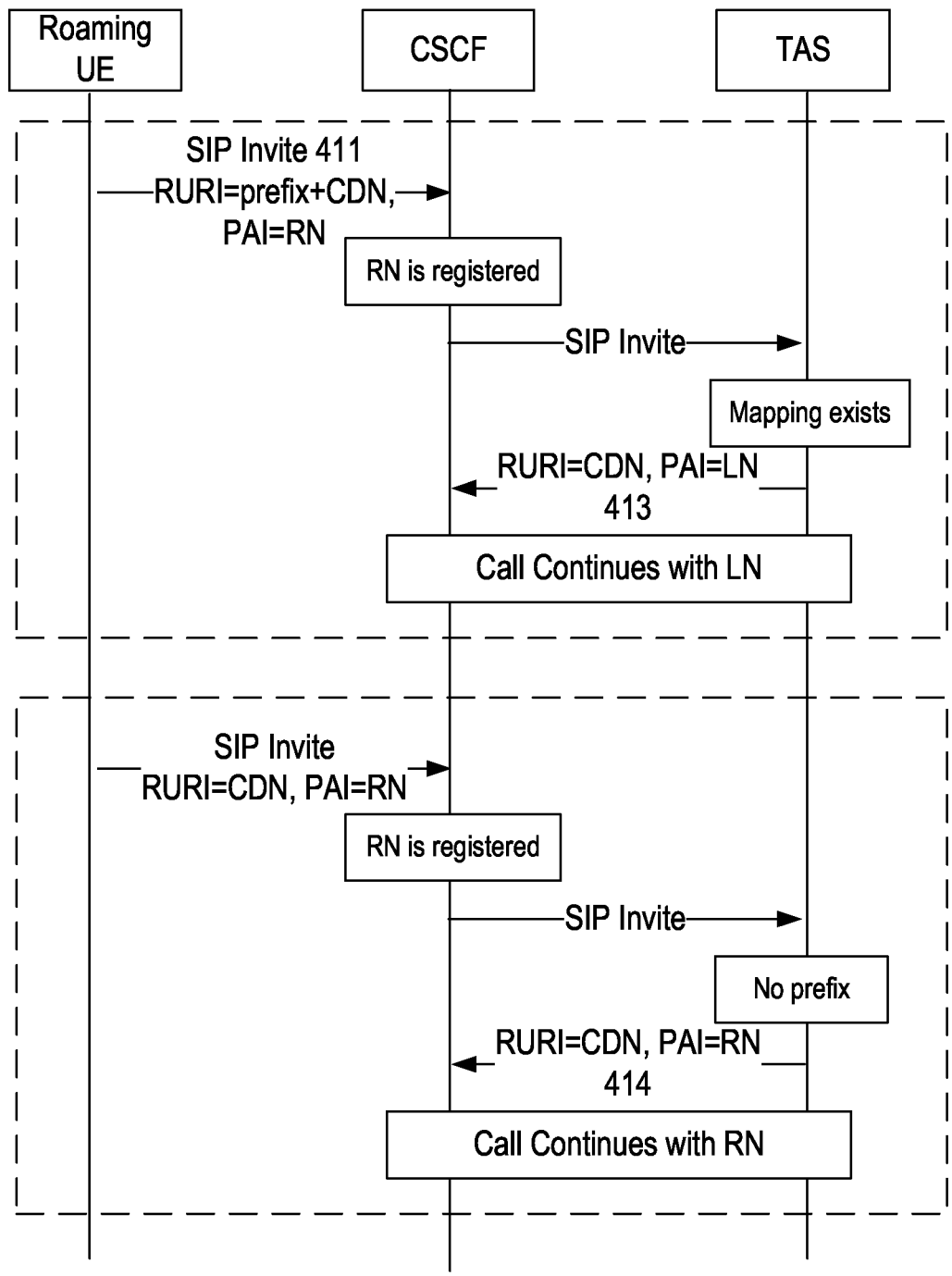
FIG. 4B illustrates example signaling sequences for mobile originating calls in accordance with one or more embodiments of the present technology.

FIG. 4B illustrates example signaling sequences for mobile originating calls in accordance with one or more embodiments of the present technology. When the roaming UE initiates an outgoing call or service request using the local number as an identity, it sends an SIP invite message to the CSCF at operation 411. The SIP invite message carries a Request Uniform Resource Identifier (RURI) that has a prefix value indicating that the call or the service request is from a roaming number using the local number as identity. The RURI also includes a Content Delivery Network (CDN) value. The SIP invite message further carries a P-Asserted-Identity (PAI) that is set to the roaming number (RN). Because the RN matches the registered RN IMPU during the IMS registration procedure, the SIP invite request can be forwarded to the TAS per configuration from the user profile at operation 412. The TAS has obtained the user profile and the mapping between the RN and LN as part of the IMS registration procedure. Once the TAS receives the SIP invite request, it recognizes the prefix (indicating that a local number is used as identity), removes the prefix from the RURI, and replaces the SIP PAI header with the local number (LN) in an outgoing SIP invite message back to the CSCF at operation 413. The call initiation process then proceeds using the LN in the VPLMN.

When the roaming UE initiates an outgoing call or a service request using the roaming number as an identity, the SIP invite message that it sends to the CSCF does not include the prefix value in the RURI indicating that the call or the service request is from a roaming number using local number as identity. Because the RURI does not include the prefix, the TAS continues the call or the service request as a normal roaming call/service request. For example, the TAS includes the original RURI (without prefix) and the RN in the PAI header in its outgoing SIP invite message back to the CSCF at 414. In some embodiments, the control of the user services can remain in the visited network. In some embodiments, the control of the user services can be routed back to the home network.

For inbound calls or services (e.g., the roaming UE is on the receiving side of the calls), both the local number and the roaming numbers of the roaming UE are dialable. In particular, the local number can be looked up to find the serving CSCF and corresponding TAS. The roaming UE can be alerted of the incoming call, indicating whether the local number or the roaming number is used for the call.

Figure 4C:
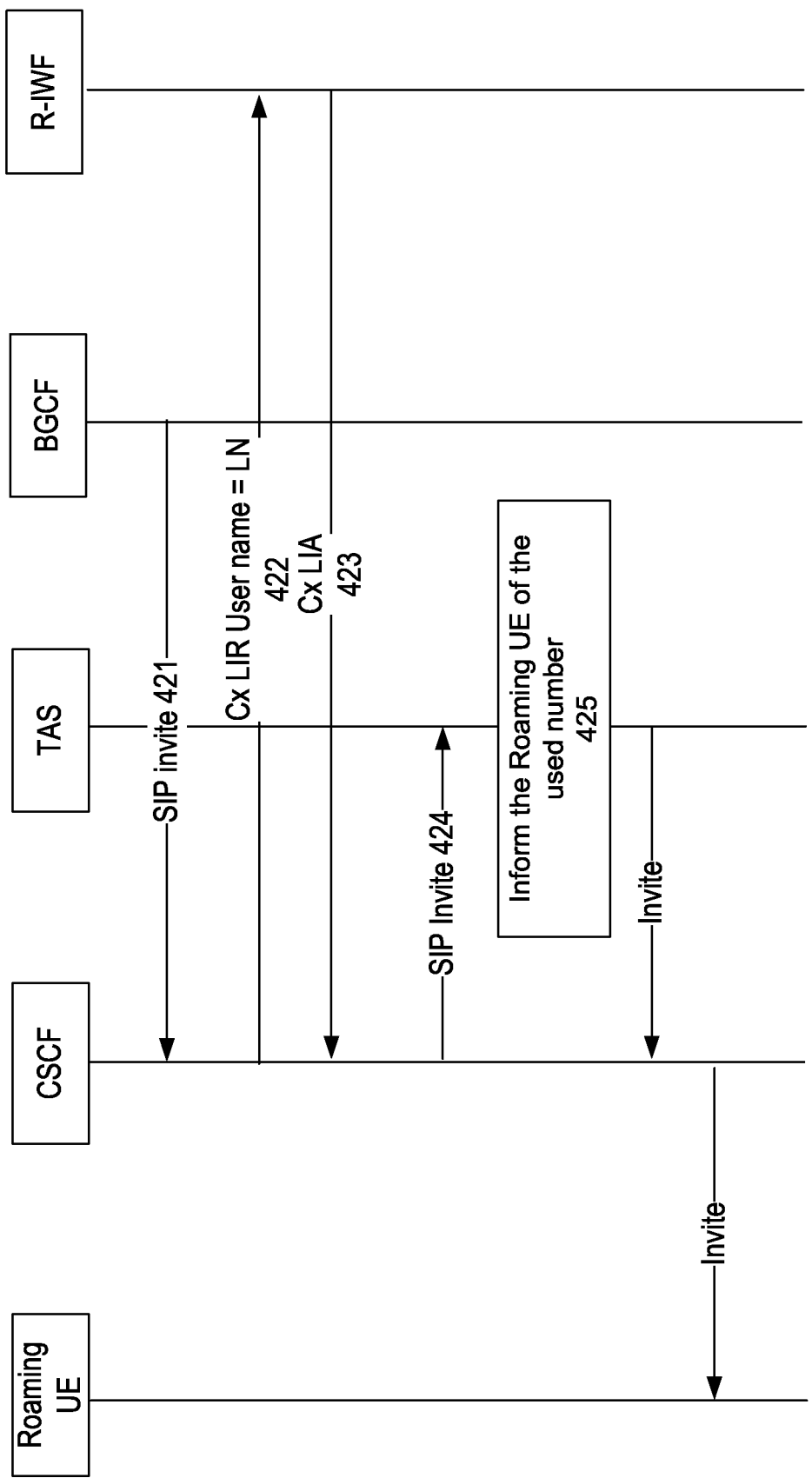
FIG. 4C illustrates an example signaling sequence for mobile terminating calls in accordance with one or more embodiments of the present technology.

FIG. 4C illustrates an example signaling sequence for mobile terminating calls in accordance with one or more embodiments of the present technology. In this example, the LN is the dialable number used for the call. The BGCF receives an SIP invite message for an incoming call or service request with RURI set to the LN of the roaming UE. The BGCF selects an appropriate CSCF and routes the message to the CSCF at operation 421. The CSCF transmits a message (e.g., Cx Location-Info-Request (LIR) message) with the LN to the R-IWF at operation 422. Because the R-IWF caches information about where the corresponding RN is registered during the IMS registration procedure, it can provide such information back to enable the CSCF to properly route the call/service request at 423, e.g., via the Cx Location-Info-Answer (LIA) message. The CSCF forwards the SIP invite message to the TAS at operation 424. In some embodiments, the TAS has the option at operation 425 to transmit a message to the UE via IMS core elements before the SIP invite to allow the roaming UE to know that the incoming call or service request is for its local number instead of its roaming number. The TAS and CSCF then proceed to complete the SIP call process.

If the incoming call or service request is directed to the roaming number, a similar signaling sequence as shown in FIG. 4C can be used. For example, the BGCF receives an SIP invite message for an incoming call or service request with RURI set to the RN of the roaming UE. The BGCF selects an appropriate CSCF and routes the message to the CSCF to allow the CSCF to transmit a Cx LIR message with the RN to the R-IWF. Because the R-IWF caches information about the CSCF where the RN is registered during the IMS registration procedure, it can provide such information back to enable the CSCF to properly route the call. The CSCF forwards the SIP invite message to the TAS. In some embodiments, the TAS has the option to transmit a message to the UE before the SIP invite to allow the roaming UE to know that the incoming call or service request is for its roaming number in the home network. The TAS and CSCF then proceed to complete the SIP call process.

Outbound Roaming

When roaming outbound into a visited network, a user can opt-in to receive a local number from a roaming partner carrier that has established an agreement with the home service provider. That is, the roaming partner carrier agrees to provide the local number functionality. In some embodiments, the roaming partner carrier can implement a network architecture to provide inbound roaming traffic management for local number management (e.g., as shown in FIG. 2).

Figure 5:
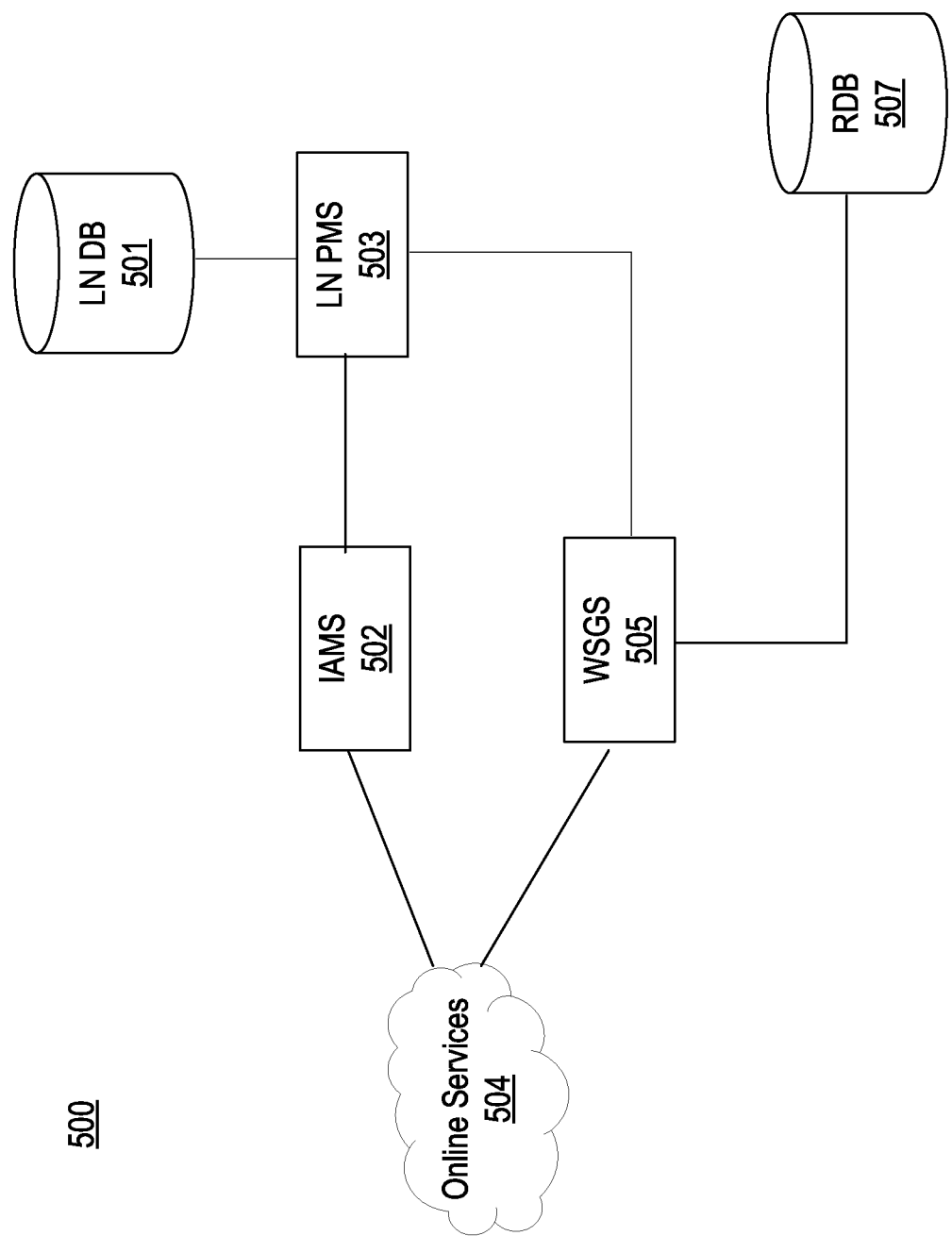
FIG. 5 illustrates an example home network architecture of a network 500 having a local number pool management system in accordance with one or more embodiments of the present technology.

In some embodiments, the management of the local numbers can be delegated to the home network. FIG. 5 illustrates an example home network architecture of a network 500 having a local number pool management system in accordance with one or more embodiments of the present technology. The network 500 includes a LN Database (DB) 501 that is configured to store the pool of local numbers reserved by the roaming partner carrier. The network 500 also includes a LN PMS 503 that is configured to support the mapping between international roaming numbers and the local reserved numbers, and to provide life cycle management of these local numbers.

When a roaming user leaves the HPLMN and enters the VPLMN to use the online services 504, an Identity and Access Management Server (IAMS) 503 configured to provide identify management and provide access control to various services checks whether the user is authorized to use roaming services. If the user has requested or indicated that a local number is desired, the LN PMS 503 can query the LN DB 501 to query a local number from the pool of reserved and available local numbers. When the local number is assigned to a roaming user, the assigned local number is mapped to the international number of the roaming user.

The mapping between the roaming international number and the local number can be stored in the Roaming Database (RDB) 507 via the Web Services Gateway Server (WSGS) 505, which is a point of control, access and validation of Web service requests. For example, the local number can be stored as a primary number and international number can be stored as secondary number. In some embodiments, the roaming partner carrier triggers the storing of the mapping information to the RDB via the WSGS. Subsequently, when the roaming user requests an online service, a query to the RDB can be made to determine whether the mapping exists. Alternatively, or in addition, the RDB pushes the information to the serving TAS of the outbound roamer (e.g., in the VoLTE network) or responds to the TAS's queries of the information for unregistered services (e.g., for circuit switched services).

In some embodiments, similar to the architecture as shown in FIG. 2, the LN PMS 503 can communicate with the WSGS 505 and LN DB 501 using the REST Application Programming Interface (API) or other types of APIs. The LN PMS 503 is responsible for enforcing various policies regarding the use of the local numbers. For example, the LN PMS 503 can enforce a one-to-one mapping of the roaming number and the local number. That is, each roaming user can only be assigned with one local number. As another example, the LN PMS 503 can also manage the life cycle of the mapping by enforcing a recycling/reusing policy of the local numbers, e.g., for privacy projection and security concerns. In some embodiments, once the local number is assigned and a mapping is created, the local number stays activated and valid for as long as the roaming user is registered with the network. The LN PMS 503 can refresh a timestamp that is associated with the local number indicating whether the local number is actively being used by the roaming user. Once the roaming user de-registers with the network (e.g., returning to its home network), the assigned local number is deactivated. The recycling/reusing policy can specify that the deactivated local number cannot be assigned again to another roaming user for a predetermined period of time (e.g., 60 days).

Figure 6:
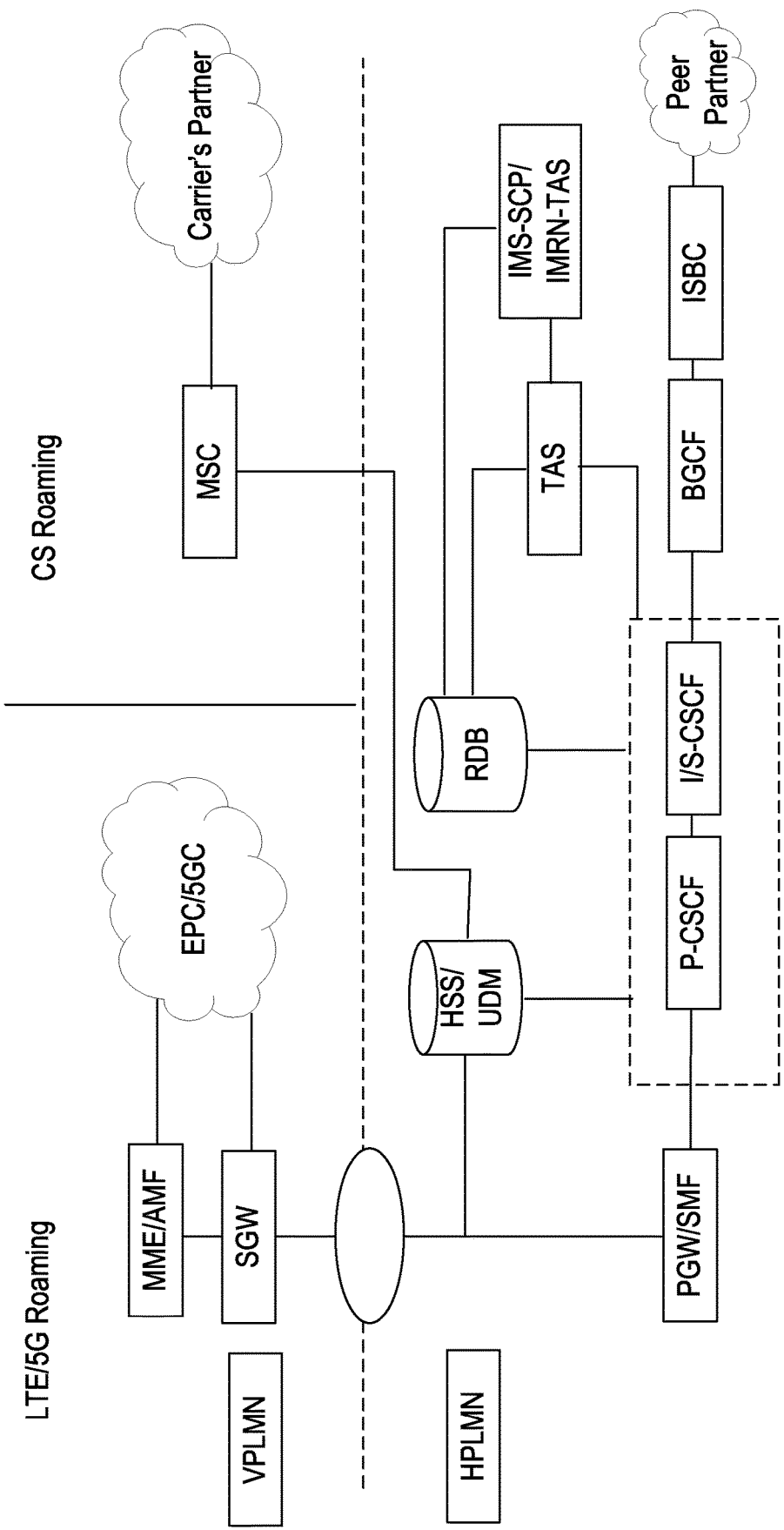
FIG. 6 illustrates an example high-level network architecture for outbound roaming scenarios in accordance with one or more embodiments of the present technology.

FIG. 6 illustrates an example high-level network architecture for outbound roaming scenarios in accordance with one or more embodiments of the present technology. In this example, the VPLMN communicates with the HPLMN via the gateway servers, such as Serving Gateway (SWG) and/or the Packet Data Network Gateway (PWG). The HPLMN reserves the pool of local numbers and can manage the mapping of the local and roaming numbers. The HPLMN includes the HSS or the UDM for providing user information as well as the RDB for the storage of the mapping information. The HSS/UDM is in communication with the P-CSCF, I-CSCF, and/or the S-CSCF (together referred to as the CSCF). The RDB is in communication with the CSCF to provide local number and/or mapping information. The RDB is also connected to a TAS and an IMS-Service Control Point (SCP) or IMS IP Multimedia Routing Number (IMRN)-TAS. Other network functions/nodes, such as the Breakout Gateway Control Function (BGCF) and the Interconnect Session Border Controller (ISBC), are also connected to provide communication to peer partners.

For LTE/5G roaming, the VPLMN includes the MME and SGW or the AMF. The S8HR architecture as described in the Third-Generation Partnership Project (3GPP) standard can be adopted in some embodiments. If LTE/5G roaming is not supported or available, Circuit Switched (CS) roaming can be used for outbound roamers in carrier's CS network. The VPLMN also includes the Mobile Switching Center (MSC) for the proper routing of the calls. It is noted that the architecture shown in FIG. 6 can be adapted to allow the HPLMN to manage the mapping of the LNs and RNs.

Figure 7A:
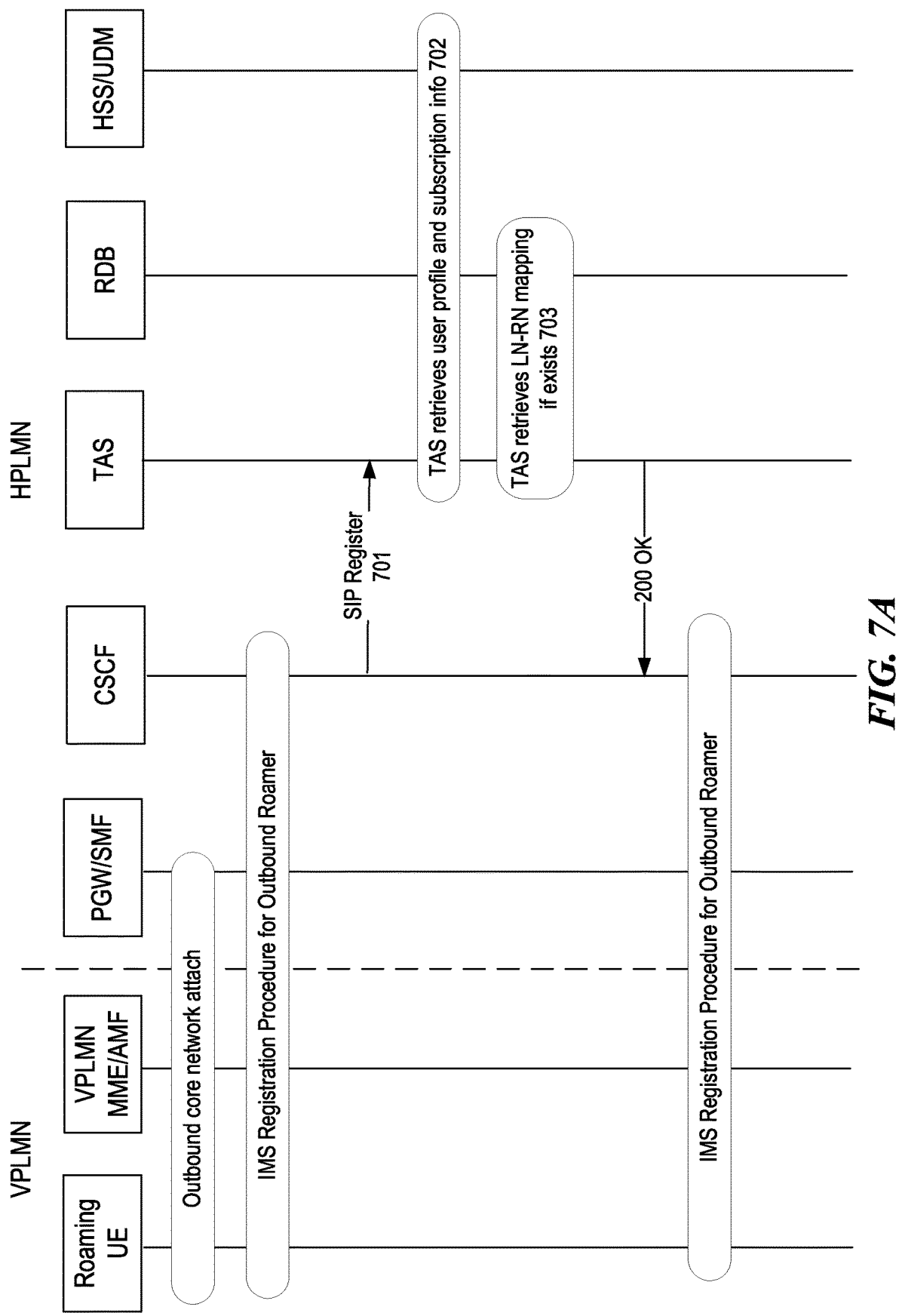
FIG. 7A illustrates an example signaling sequence for IMS registration for outbound roaming users in accordance with one or more embodiments of the present technology.

FIG. 7A illustrates an example signaling sequence for IMS registration for outbound roaming users in accordance with one or more embodiments of the present technology. In this example, the roaming partner carrier reserves local numbers for roaming users but leaves the management of the numbers to the home network carrier. A roaming UE is first attached to the core network via the VPLMN MME/AMF and then initiates the IMS registration procedure. The VPLMN (e.g., roaming partner carrier) routes the message back to the home network. Upon receiving the SIP register message, the HPLMN CSCF forwards the message to TAS at operation 701. The TAS retrieves the user profile and subscription information from the HSS/UDM at operation 702. The TAS also retrieves the LN-RN mapping from the RDB at operation 703 if such mapping exists. The IMS registration procedure then completes.

For outgoing calls or services (e.g., the roaming UE initiates such calls or service requests), a specific prefix can be used to indicate whether the local number can be used. In some embodiments, the local number mapping is enabled for all regular calls/services. In some embodiments, the local number mapping is only enabled for a subset of services/applications (e.g., mobile delivery applications), for example, at an application/service level. If the prefix is not used, the roaming number remains the default number to be used for the call. For example, in some embodiments, the local number mapping is disabled for special calls, such as emergency services and other services to provide accurate international user information for the relevant authorities.

Figure 7B:
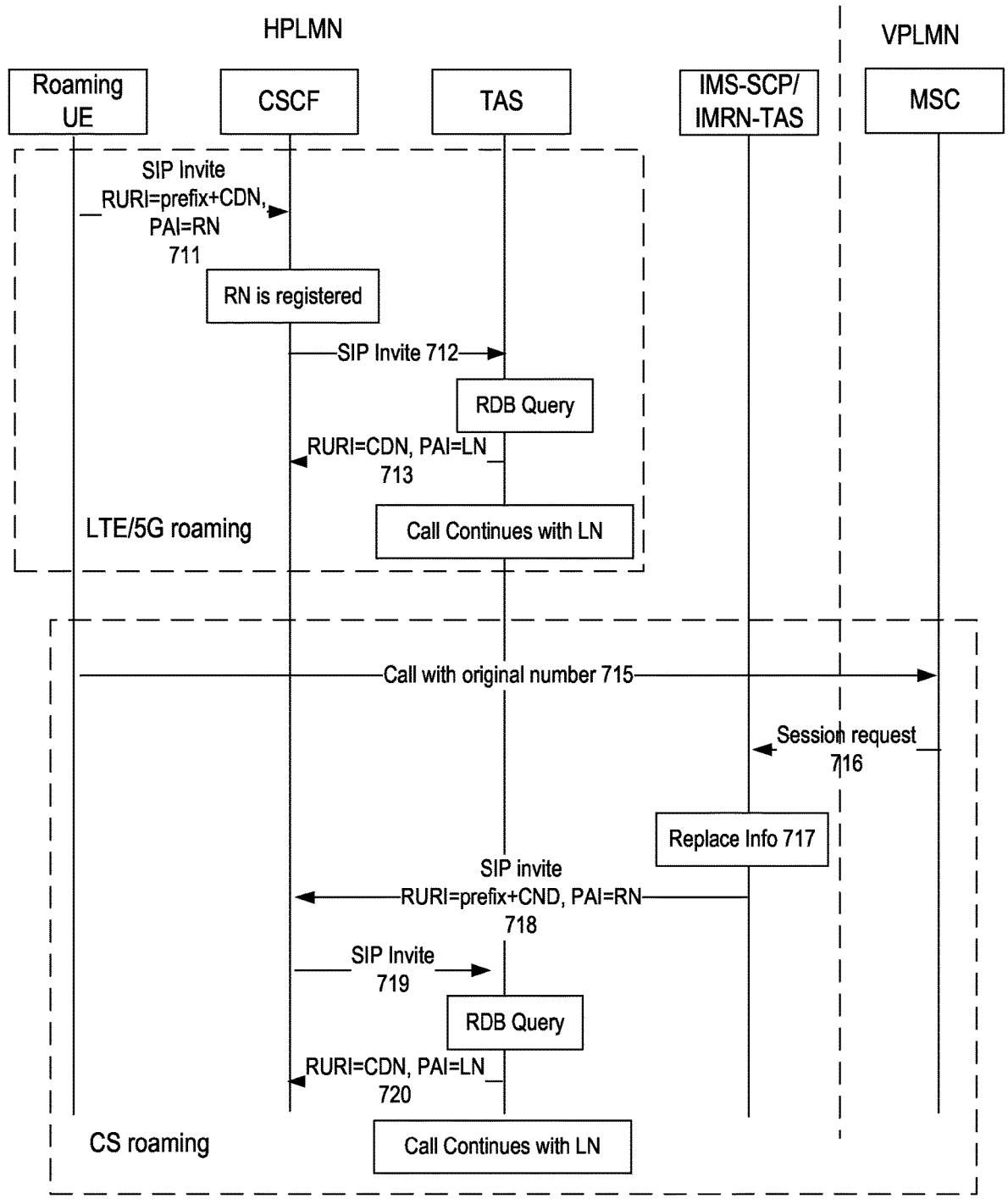
FIG. 7B illustrates example signaling sequences for mobile originating calls in accordance with one or more embodiments of the present technology.

FIG. 7B illustrates example signaling sequences for mobile originating calls in accordance with one or more embodiments of the present technology. For Voice Over LTE (VoLTE) in LTE or Voice Over New Radio (VoNR) in 5G, when the roaming UE initiates an outgoing call or service request using the local number as an identity, it sends an SIP invite message to the CSCF at operation 711. The SIP invite message carries a Request Uniform Resource Identifier (RURI) that has a prefix value indicating that the call or the service request is from a roaming number using local number as identity. The RURI also carries a Called Number (CDN) value. The SIP invite message further carries a P-Asserted-Identity (PAI) that is set to the roaming number (RN). Because the RN matches the registered RN IMPU during the IMS registration procedure, the SIP invite request is forwarded to the TAS at operation 712 per configuration from the user profile. The TAS has obtained the user profile and the mapping between the RN and LN as part of the IMS registration procedure. Once the TAS receives the SIP invite request, it recognizes the prefix (indicating that a local number is used as identity), removes the prefix from the RURI, and replaces the SIP PAI header with the local number (LN) in an outgoing SIP invite message back to the CSCF at operation 713. The call initiation process then proceeds using the LN in the VPLMN and/or the HPLMN in case of S8HR roaming architecture.

For Circuit Switch (CS) calls, the calls with the specific prefix value(s) are directed to the MSC in the VPLMN at operation 715 and then directed to the IMS-SCP/IMRN-TAS at operation 716. The IMS-SCP/IMRN-TAS stores the original calling and called party with addresses and prefix along the called party and reserves the IMRN number which it responds back to the MSC in VPLMN. The MSC in VPLMN sends a session request for session information using the IMRN, leading the session request to the IMS-SCP/IMRN TAS in the HPLMN. Once the IMS-SCP/IMRN-TAS retrieves the session information with original calling and called information used by the roaming UE, it replaces it in the outgoing SIP invite to the CSCF at operation 718 with information indicating the mapping of the local number and the roaming number. The SIP invite request is forwarded to the TAS at operation 719 per configuration from the user profile. Once the TAS receives the SIP invite request, it examines the prefix to determine if it needs to query the RDB and replace the subscriber number with the local number. In this specific example, the serving TAS replaces the SIP PAI header with the local number (LN) in an outgoing SIP invite message back to the CSCF at operation 720. The call initiation process then proceeds using the LN in the VPLMN. If the user initiates the call or services without the prefix (that is, using its own roaming number), the roaming number is then used for the session.

Figure 7C:
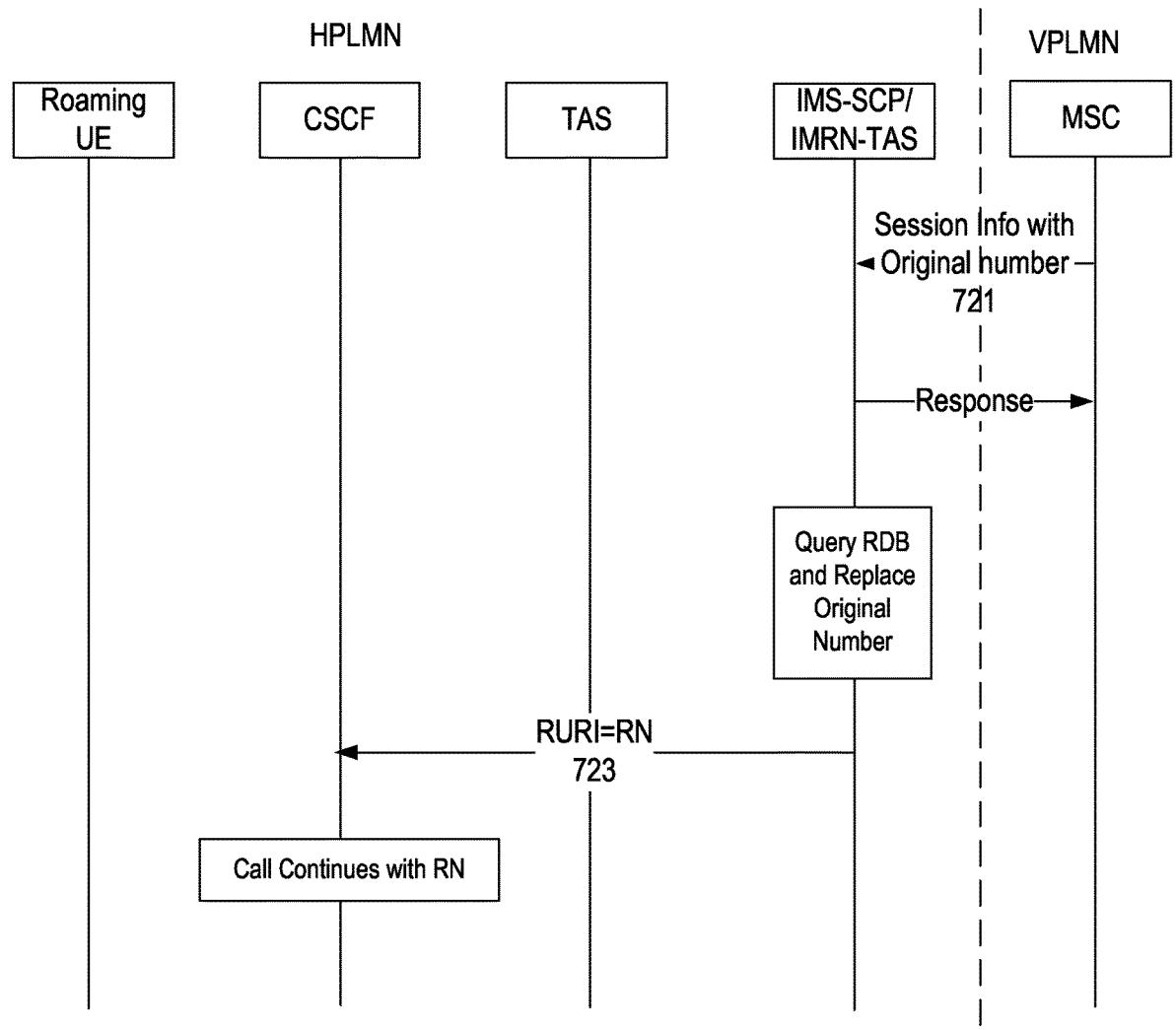
FIG. 7C illustrates an example signaling sequence for mobile terminating calls in accordance with one or more embodiments of the present technology.

For inbound calls (e.g., the roaming UE is the receiver of the calls), the local number of the roaming UE is dialable. In particular, the roaming partner carrier can trigger the request towards the home network via IMS-Routing Number (IMRN). FIG. 7C illustrates an example signaling sequence for mobile terminating calls in accordance with one or more embodiments of the present technology. The IMS-SCP/IMRN-TAS receives a message from the MSC at operation 721 with session information indicating the original calling and called party addresses. Here, the original called number is the local number of the roaming UE (that is, another device calls the roaming UE using its local number). The IMS-SCP/IMRN-TAS recognizes the original called party as an international and retrieves the mapping of the LN and RN from the RDB. The IMS-SCP/IMRN-TAS then replaces the original called party address with the RN of the roaming UE. the IMS-SCP/IMRN-TAS proceeds to transmit an SIP invite message to the CSCF at operation 723 with the RN number to continue the call process using the roaming number in the HPLMN.

Figure 8A:
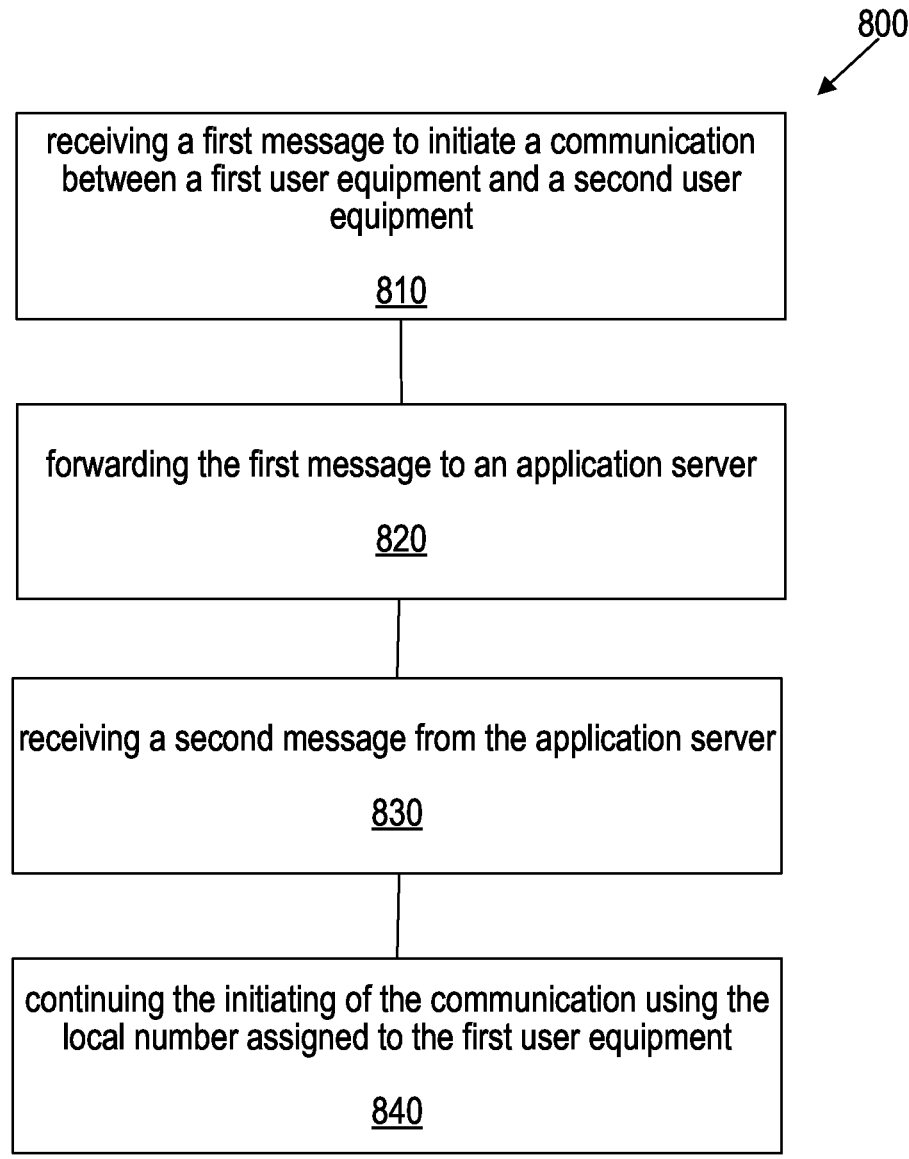
FIG. 8A is a flowchart representation of a method for wireless communication in accordance with one or more embodiments of the present technology.

FIG. 8 is a flowchart representation of a method 800 for wireless communication in accordance with one or more embodiments of the present technology. The method 800 includes, at operation 810, receiving, by a first network node configured to manage call sessions in a first network (e.g., CSCF), a first message to initiate a communication between a first user equipment and a second user equipment. The first message can be from the first user equipment (e.g., as shown in FIG. 4B) or from a network node such as the IMS-SCP/IMRN-TAS (e.g., as shown in FIG. 7B, CS roaming scenario).

The first message includes a value (e.g., a specific prefix) indicating that the first user equipment is a roaming device from a second network and that the first user equipment is assigned a local number in the first network. The first message further includes a roaming number of the first user equipment in the second network. The method 800 includes, at operation 820, forwarding, by the first network node, the first message to an application server (e.g., TAS) in the first network. The application server is configured to query a database to determine whether a mapping between the roaming number of the first user equipment and the local number of the first user equipment exists.

The method 800 includes, at operation 830, receiving, by the first network node, a second message from the application server. The second message includes a local number assigned to the first user equipment in the first network. The method 800 also includes, at operation 840, continuing the initiating of the communication using the local number assigned to the first user equipment.

In some embodiments, the method 800 also includes transmitting, by the first network node prior to receiving the first message, a request to an interworking function to register the first user equipment and receiving, by the first network node, a response from the interworking function, the response carrying information about the local number assigned to the first user equipment (e.g., as shown in FIG. 4A).

Figure 8B:
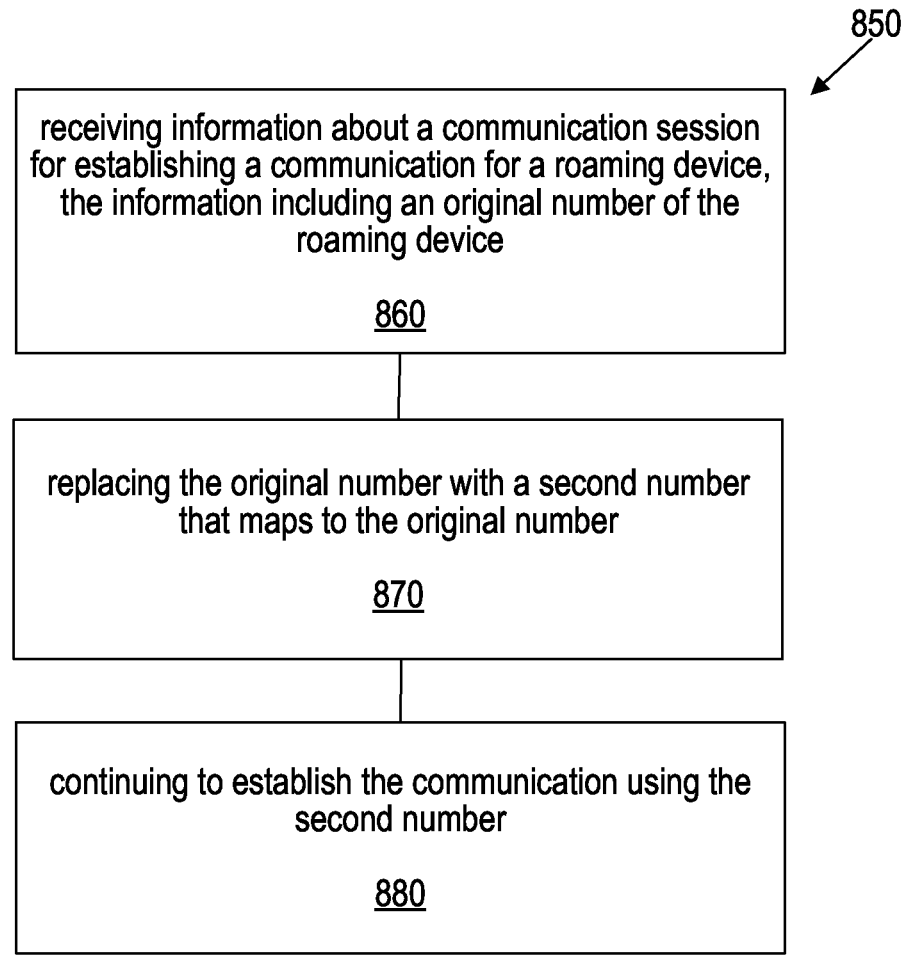
FIG. 8B is a flowchart representation of another method for wireless communication in accordance with one or more embodiments of the present technology.

FIG. 8B is a flowchart representation of a method 850 for wireless communication in accordance with one or more embodiments of the present technology. The method 850 includes, at operation 860, receiving, by a first network node in a first network (e.g., IMS-SCP/IMRN-TAS), information about a communication session from a second network node in a second network (e.g., the MSC) for establishing a communication for a roaming device. The information includes an original number of the roaming device. The original number can a roaming number of the roaming device in an outgoing call or service request initiated by the roaming device. The original number can also be a local number assigned to the roaming device in an incoming call or service request to the roaming device.

The method 850 includes, at operation 870, replacing the original number with a second number that maps to the original number. In some embodiments, the method includes querying, by the first network node prior to replacing the original number, a database to determine whether a mapping between the original number and the second number exists. The method 850 also includes, at operation 880, continuing to establish the communication using the second number.

Figure 9:
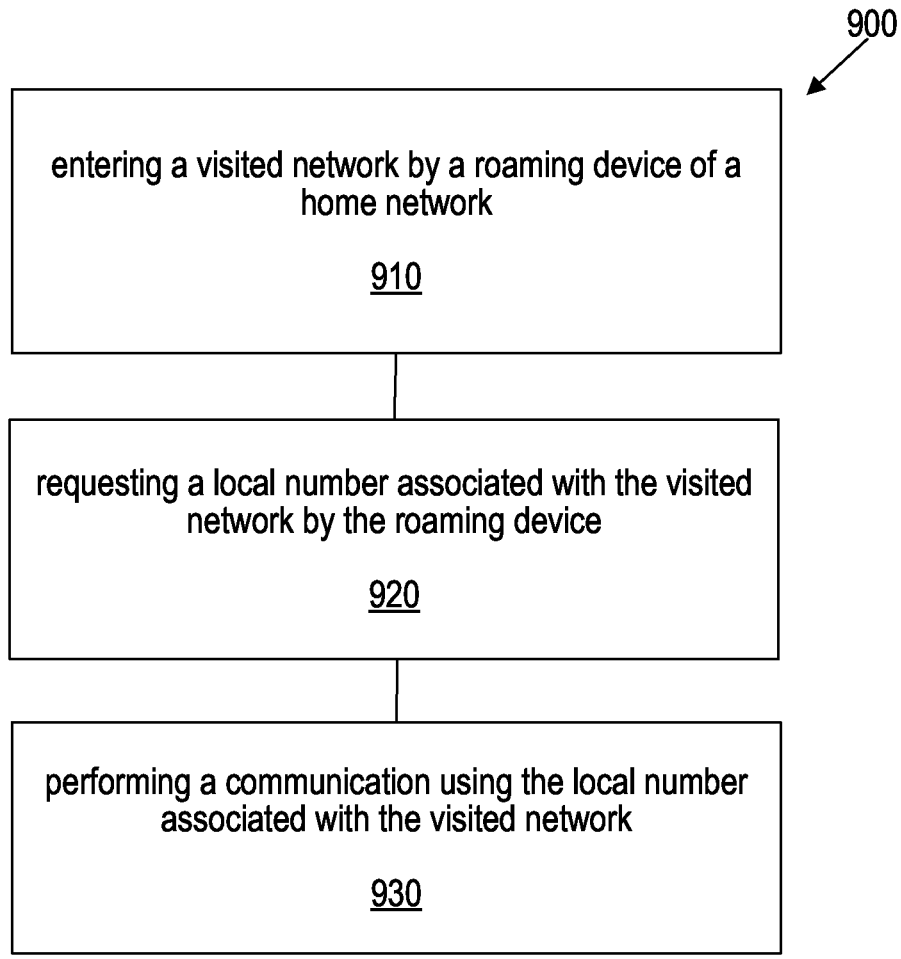
FIG. 9 is a flowchart representation of yet another method for wireless communication in accordance with one or more embodiments of the present technology.

FIG. 9 is a flowchart representation of a method 900 for wireless communication in accordance with one or more embodiments of the present technology. The method 900 includes, at operation 910, entering a visited network by a roaming device of a home network. The roaming device has a roaming number associated with the home network. The method 900 includes, at operation 920, requesting a local number associated with the visited network by the roaming device. The method also includes, at operation 930, performing a communication using the local number associated with the visited network.

In some embodiments, the method includes receiving, by roaming device, a message from the visited network. The message requests the roaming device to indicate whether the local number is needed. In some embodiments, the request of the local number is performed using a user interface (e.g., an online portal provided by the carrier). In some embodiments, performing the communication comprises at least initiating a call or accessing data (e.g., using a mobile application) in the visited network. In some embodiments, performing the communication comprises receiving a call from another mobile device and the method further includes receiving an indication by the roaming device indicating whether the local number of the roaming number is used for the call. In some embodiments, performing the communication comprises transmitting a request for initiating the communication. The request comprises a specific value (e.g., a specific prefix) indicating that the roaming device is assigned the local number in the visited network.

Wireless Communications System

Figure 10:
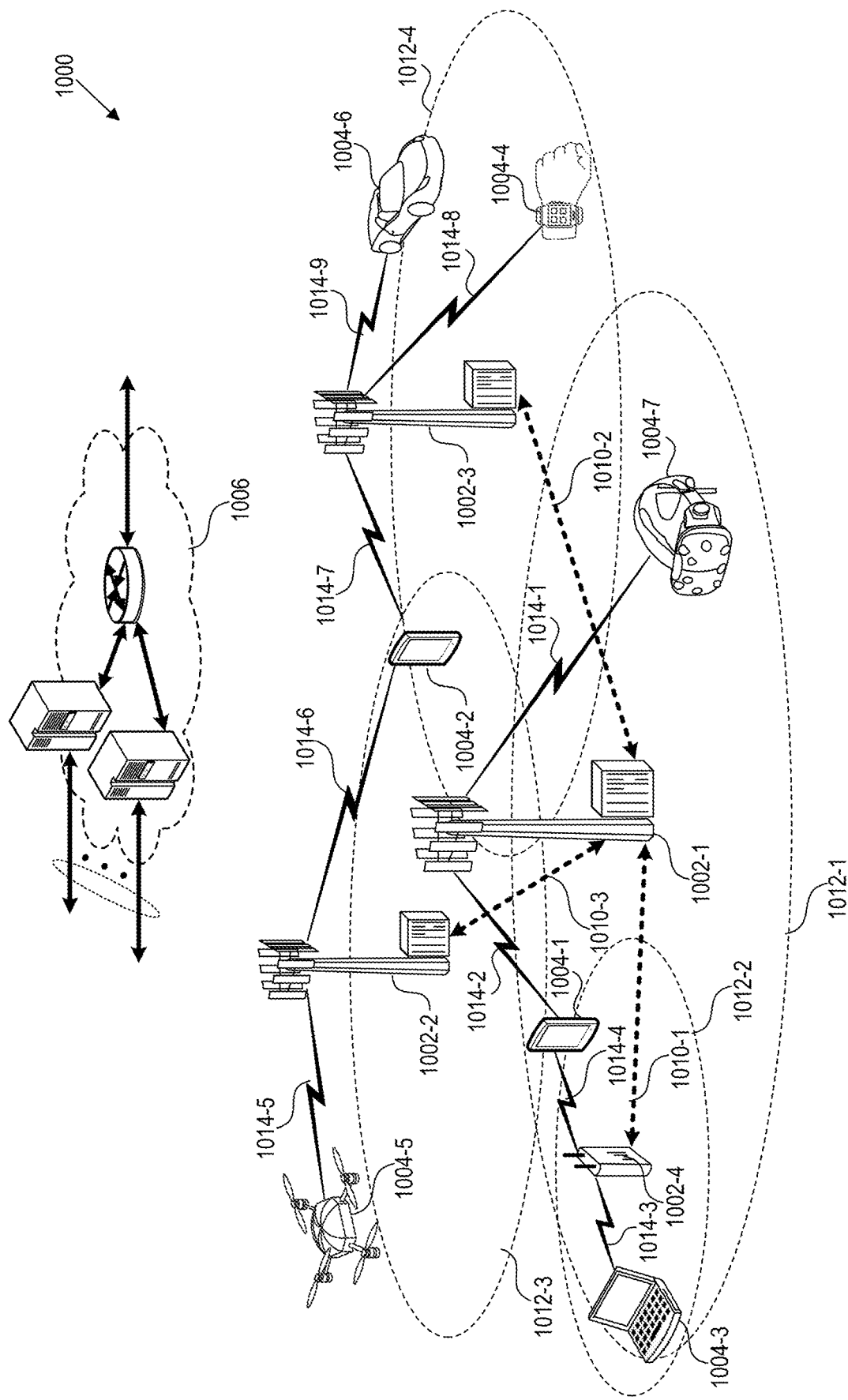
FIG. 10 is a diagram that illustrates a wireless telecommunication network in which aspects of the disclosed technology are incorporated.

FIG. 10 is a diagram that illustrates a wireless telecommunication network 1000 ("network 1000") in which aspects of the disclosed technology are incorporated. The network 1000 includes base stations 1002-1 through 1002-4 (also referred to individually as "base station 1002" or collectively as "base stations 1002"). A base station is a type of network access node (NAN) that can also be referred to as a cell site, a base transceiver station, or a radio base station. The network 1000 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 1000 formed by the network 1000 also include wireless devices 1004-1 through 1004-7 (referred to individually as "wireless device 1004" or collectively as "wireless devices 1004") and a core network 1006. The wireless devices 1004-1 through 1004-7 can correspond to or include network 1000 entities capable of communication using various connectivity standards. For example, a 5G communication channel can use millimeter wave (mmW) access frequencies of 28 GHz or more. In some implementations, the wireless device 1004 can operatively couple to a base station 1002 over a long-term evolution/long-term evolution-advanced (LTE/LTE-A) communication channel, which is referred to as a 4G communication channel.

The core network 1006 provides, manages, and controls security services, user authentication, access authorization, tracking, Internet Protocol (IP) connectivity, and other access, routing, or mobility functions. The base stations 1002 interface with the core network 1006 through a first set of backhaul links (e.g., S1 interfaces) and can perform radio configuration and scheduling for communication with the wireless devices 1004 or can operate under the control of a base station controller (not shown). In some examples, the base stations 1002 can communicate with each other, either directly or indirectly (e.g., through the core network 1006), over a second set of backhaul links 1010-1 through 1010-3 (e.g., X1 interfaces), which can be wired or wireless communication links.

The base stations 1002 can wirelessly communicate with the wireless devices 1004 via one or more base station antennas. The cell sites can provide communication coverage for geographic coverage areas 1012-1 through 1012-4 (also referred to individually as "coverage area 1012" or collectively as "coverage areas 1012"). The geographic coverage area 1012 for a base station 1002 can be divided into sectors making up only a portion of the coverage area (not shown). The network 1000 can include base stations of different types (e.g., macro and/or small cell base stations). In some implementations, there can be overlapping geographic coverage areas 1012 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 1000 can include a 5G network 1000 and/or an LTE/LTE-A or other network. In an LTE/LTE-A network, the term eNB is used to describe the base stations 1002, and in 5G new radio (NR) networks, the term gNBs is used to describe the base stations 1002 that can include mmW communications. The network 1000 can thus form a heterogeneous network 1000 in which different types of base stations provide coverage for various geographic regions. For example, each base station 1002 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 1000 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 1000 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 1000 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 1004 and the base stations 1002 or core network 1006 supporting radio bearers for the user plane data. At the Physical (PHY) layer, the transport channels are mapped to physical channels.

Wireless devices can be integrated with or embedded in other devices. As illustrated, the wireless devices 1004 are distributed throughout the system 1000, where each wireless device 1004 can be stationary or mobile. For example, wireless devices can include handheld mobile devices 1004-1 and 1004-2 (e.g., smartphones, portable hotspots, tablets, etc.); laptops 1004-3; wearables 1004-4; drones 1004-5; vehicles with wireless connectivity 1004-6; head-mounted displays with wireless augmented reality/virtual reality (AR/VR) connectivity 1004-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 1004-1, 1004-2, 1004-3, 1004-4, 1004-5, 1004-6, and 1004-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 1000 equipment at the edge of a network 1000 including macro eNBs/gNBs, small cell eNBs/gNBs, relay base stations, and the like. A wireless device can also communicate with other wireless devices either within or outside the same coverage area of a base station via device-to-device (D2D) communications.

The communication links 1014-1 through 1014-9 (also referred to individually as "communication link 1014" or collectively as "communication links 1014") shown in network 1000 include uplink (UL) transmissions from a wireless device 1004 to a base station 1002, and/or downlink (DL) transmissions from a base station 1002 to a wireless device 1004. The downlink transmissions can also be called forward link transmissions while the uplink transmissions can also be called reverse link transmissions. Each communication link 1014 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 1014 can transmit bidirectional communications using frequency division duplex (FDD) (e.g., using paired spectrum resources) or Time division duplex (TDD) operation (e.g., using unpaired spectrum resources). In some implementations, the communication links 1014 include LTE and/or mmW communication links.

In some implementations of the network 1000, the base stations 1002 and/or the wireless devices 1004 include multiple antennas for employing antenna diversity schemes to improve communication quality and reliability between base stations 1002 and wireless devices 1004. Additionally or alternatively, the base stations 1002 and/or the wireless devices 1004 can employ multiple-input, multiple-output (MIMO) techniques that can take advantage of multi-path environments to transmit multiple spatial layers carrying the same or different coded data.

Computer System

Figure 11:
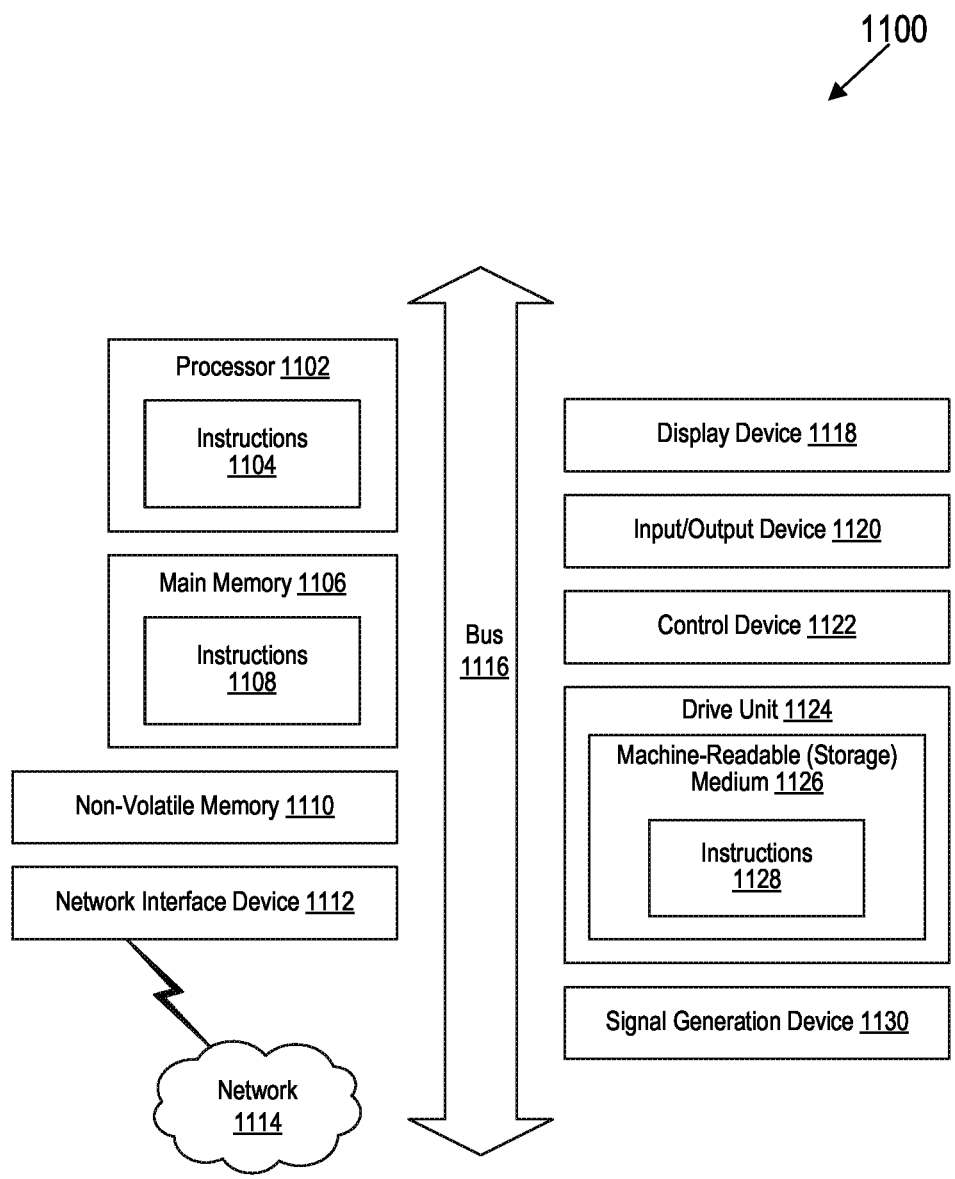
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 7 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

It is thus appreciated that the techniques disclosed herein can be implemented in various embodiments of dual-/multi-connectivity to single-connectivity transitions to ensure that carrier aggregation, if previously have been adopted, can be restored so as to provide optimal bandwidth and transmission rates for the UEs.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system for managing a temporary local number assigned to a roaming mobile device, comprising:
   a first network node configured to assign the temporary local number to the roaming mobile device according to a policy,
      wherein the temporary local number is selected from a pool of reserved local numbers, and
      wherein the policy specifying that local numbers in the pool of reserved local numbers that have been used in a predetermined time duration are not available for the assigning; and
   a first database in communication with the first network node, the first database configured to store a mapping between a roaming number of the roaming mobile device and the temporary local number assigned to the roaming mobile device.

2. The system of claim 1, wherein the temporary local number is associated with a timestamp, and wherein the first network node is configured to update the timestamp upon the temporary local number being used by the roaming mobile device.

3. The system of claim 1, wherein the policy further specifies that the roaming number of the roaming mobile device has a one-to-one correspondence with the temporary local number.

4. The system of claim 1, wherein the policy further specifies that a default validity period for the temporary local number.

5. The system of claim 1, further comprising:
   a second database configured to store the pool of reserved local numbers.

6. The system of claim 1, wherein the first network node and the first database are in communication via a gateway node.

7. The system of claim 1, wherein the roaming number of the roaming mobile device is a primary number in a home network of the roaming mobile device, and wherein the temporary local number is assigned to the roaming mobile device upon the roaming mobile device registering as a foreign device in a visited network.

* * * * *